(12) United States Patent
De Bernardi et al.

(10) Patent No.: US 10,371,223 B2
(45) Date of Patent: Aug. 6, 2019

(54) BRAKE DEVICE AND LINEAR ACTUATOR EMPLOYING THE BRAKE DEVICE

(71) Applicant: AKTIEBOLAGET SKF, Gothenburg (SE)

(72) Inventors: Alberto De Bernardi, Turin (IT); Enrico Di Stefano, Rivoli (IT); Ciney Zhang, Shanghai (CN); Leo Shen, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/252,700

(22) Filed: Aug. 31, 2016

(65) Prior Publication Data

US 2017/0058980 A1    Mar. 2, 2017

(30) Foreign Application Priority Data

Aug. 31, 2015    (CN) .......................... 2015 1 0565969

(51) Int. Cl.
| | |
|---|---|
| F16D 65/18 | (2006.01) |
| F16D 65/00 | (2006.01) |
| F16D 121/24 | (2012.01) |
| F16D 125/40 | (2012.01) |
| F16D 125/58 | (2012.01) |
| F16D 125/48 | (2012.01) |

(52) U.S. Cl.
CPC .......... *F16D 65/18* (2013.01); *F16D 2121/24* (2013.01); *F16D 2125/40* (2013.01); *F16D 2125/48* (2013.01); *F16D 2125/582* (2013.01)

(58) Field of Classification Search
CPC ............... F16D 65/18; F16D 2125/582; F16D 2125/40; F16D 2125/48; F16D 2121/24
See application file for complete search history.

(56) References Cited

U.S. PATENT DOCUMENTS 3,539,041 A * 11/1970 Sacchini ................. F16D 67/02
                                                                188/134
3,726,372 A *  4/1973 Baer ...................... F16D 13/025
                                                                192/26

(Continued)

OTHER PUBLICATIONS

Maggie Welsh, "An IPR First Impression: Admitted Prior Art is Prior Art", Apr. 23, 2015 (Year: 2015).*

*Primary Examiner* — Melody M Burch
(74) *Attorney, Agent, or Firm* — Laurence A. Greenberg; Werner H. Stemer; Ralph E. Locher

(57) ABSTRACT

A brake device for a linear actuator is provided having a torque transmission mechanism for forward transfer of driving torque and a spring friction mechanism for blocking backward transfer of load torque. The mechanism provides an input shaft and a first coupled claw connected to the input shaft that rotates synchronously therewith, a driving torque output shaft and a second coupled claw connected to the output shaft and capable rotating synchronously therewith. The first coupled claw and second coupled claw are matched and engaged together, and used to transfer driving torque in a forward direction from the input shaft to the output shaft. The spring friction mechanism provides a brake housing and a friction coil spring disposed elastically in a cylindrical inner hole of the brake housing. The friction coil spring formed with end parts at two axial ends for hooking onto the first and second coupled claws.

9 Claims, 4 Drawing Sheets

(56) References Cited

U.S. PATENT DOCUMENTS

| | | | | |
|---|---|---|---|---|
| 4,257,497 A | * | 3/1981 | Schroeder | B60T 1/10 |
| | | | | 188/181 R |
| 4,321,992 A | * | 3/1982 | Gallo | F16D 27/105 |
| | | | | 192/81 C |
| 4,440,280 A | * | 4/1984 | Hagihara | F16D 13/08 |
| | | | | 192/36 |
| 7,648,014 B2 | * | 1/2010 | Koga | B60T 13/746 |
| | | | | 188/162 |
| 2010/0236891 A1 | * | 9/2010 | Lagarde | E06B 9/90 |
| | | | | 192/223.4 |
| 2010/0289198 A1 | * | 11/2010 | Balsells | B21F 35/00 |
| | | | | 267/151 |
| 2014/0166413 A1 | * | 6/2014 | Giering | B60T 13/741 |
| | | | | 188/156 |

\* cited by examiner

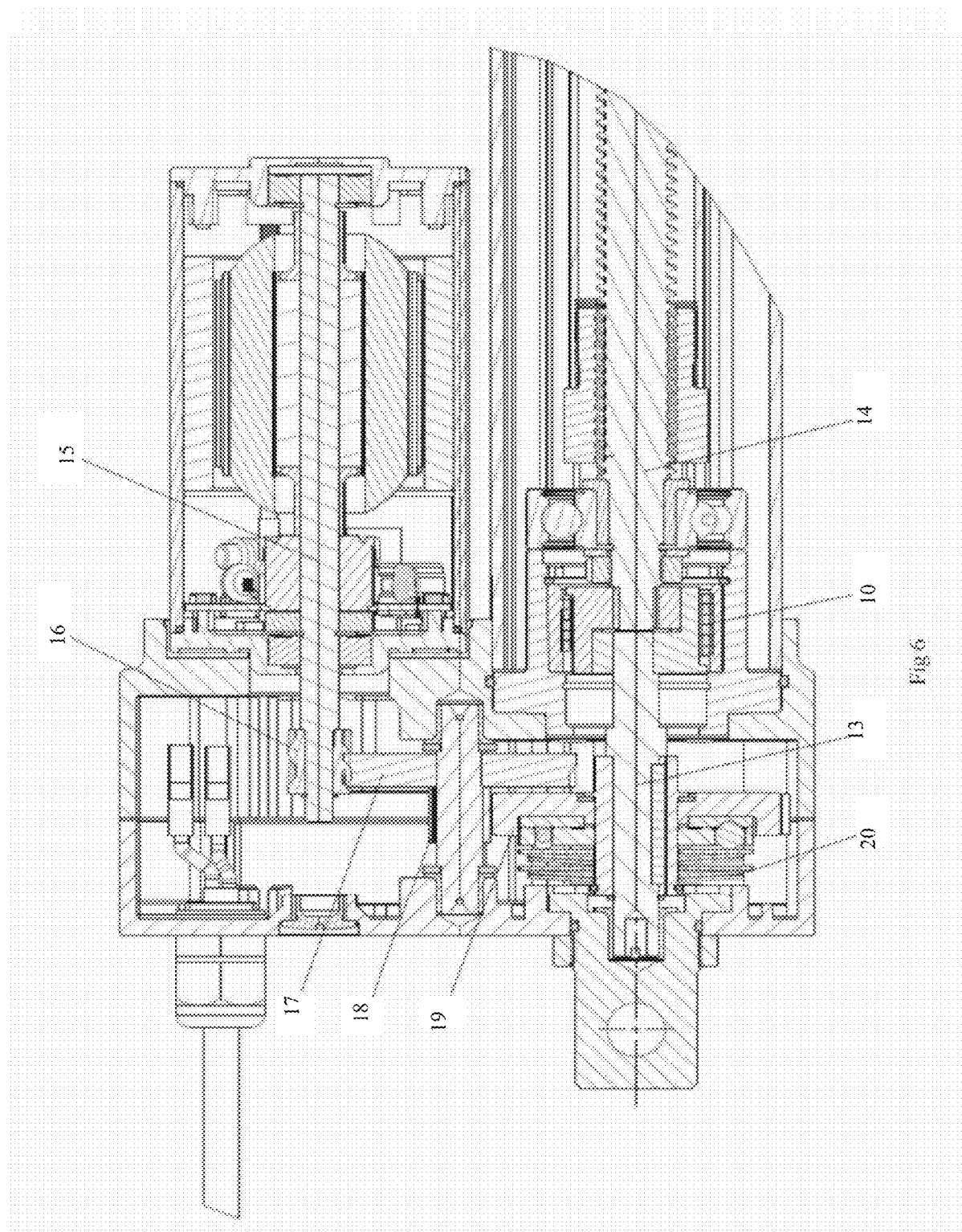

BRAKE DEVICE AND LINEAR ACTUATOR EMPLOYING THE BRAKE DEVICE

CROSS REFERENCE TO RELATED APPLICATIONS

This application claims priority to Chinese patent application no. 201510565969.8 filed on Aug. 31, 2015, the contents of which are fully incorporated herein by reference.

FIELD OF THE INVENTION

The present invention relates to a brake device, in particular to a brake device for a linear actuator. The linear actuator is used for pushing or pulling an external load.

BACKGROUND OF THE INVENTION

In actuators in the prior art, roller lead screws or threaded rods with a screw-thread but no self-locking function require a brake device to generate a braking torque in order to prevent an external load from driving the actuator in a reverse direction. The generation of such a braking torque is realized by way of friction between a steel friction spring and a plastic brake torque bushing. It has been found that existing brake devices cannot ensure that the required braking torque will be generated.

In order to further increase the braking torque, those skilled in the art design steel friction springs and plastic brake torque bushings of larger diameter. However, this design has a drawback, namely that the volume of the brake device is increased, and is difficult to implement in a cramped application space.

In addition, since, in the case of a brake device in the prior art, a brake torque bushing made of plastic must be disposed in a brake housing made of aluminum, an elastic snap ring must be used to hold the brake torque bushing in place, so the assembly process is complex and the number of components is large.

BRIEF SUMMARY OF THE INVENTION

To resolve the abovementioned shortcomings in the prior art, the present invention provides a novel brake device for a linear actuator.

According to one aspect of the present invention, a brake device for a linear actuator is proposed, comprising: a torque transmission mechanism for forward transfer of a driving torque, the torque transmission mechanism comprising a driving torque input shaft and a first coupled claw which is reliably connected to the driving torque input shaft and capable of rotating in synchrony therewith, as well as a driving torque output shaft and a second coupled claw which is reliably connected to the driving torque output shaft and capable of rotating in synchrony therewith, the first coupled claw and second coupled claw matching and being engaged with each other, and being used to transfer driving torque in a forward direction from the driving torque input shaft to the driving torque output shaft; a spring friction mechanism for blocking backward transfer of a load torque, the spring friction mechanism comprising a brake housing and a friction coil spring disposed elastically in a cylindrical inner hole of the brake housing, the friction coil spring being formed with end parts at two axial ends thereof, for hooking onto the first coupled claw and second coupled claw, and the first coupled claw being arranged to hook onto the end parts in a spiral direction of the friction coil spring along a circumference; the second coupled claw being arranged to hook onto the end parts against the spiral direction of the friction coil spring along a circumference; and the friction coil spring contacting an inner surface of the cylindrical inner hole of the brake housing, with no additional friction component being disposed there between.

The brake housing is arranged such that the coefficient of friction between the material of the inner surface thereof and the friction coil spring is greater than the coefficient of friction between a plastic material and a steel material.

The friction coil spring and the brake housing are both made of a steel material.

The brake housing is made of #45 carbon steel material.

According to another aspect of the present invention, a linear actuator is proposed, employing a brake device as described above, wherein the driving torque input shaft is an ending gear output shaft for torque transfer in the linear actuator, or is connected synchronously with the ending gear output shaft; the driving torque output shaft is a screw shaft in the linear actuator, or is connected synchronously with the screw shaft.

Based on the structure of the present invention described above, the generation of braking torque is realized by direct contact friction between the friction coil spring made of steel material and the brake housing made of #45 carbon steel material. Experiments have demonstrated that the brake device according to the present invention can ensure that the required braking torque is generated, and has no need of a brake torque bushing.

Based on the structure of the present invention described above, those skilled in the art have no need to design a steel friction spring and plastic brake torque bushing of larger diameter. The design of the present invention avoids the shortcoming of the brake device having an increased volume, and can also be implemented when the application space is cramped.

Based on the structure of the present invention described above, since the brake housing itself provides a braking torque to the friction coil spring directly, it is no longer necessary to dispose a brake torque bushing made of plastic in a brake housing made of aluminium, and there is no need to use an elastic snap ring to hold the brake torque bushing in place, therefore the assembly process is simplified while the number of components is reduced.

BRIEF DESCRIPTION OF THE SEVERAL VIEWS OF THE DRAWING

All the technical features of the present invention will become obvious on the basis of the accompanying drawings attached.

FIG. 6 shows a linear actuator employing the brake device of the present invention.

DETAILED DESCRIPTION OF THE INVENTION

Exemplary embodiments according to the present invention are explained in detail below in conjunction with the accompanying drawings.

Figure 1:
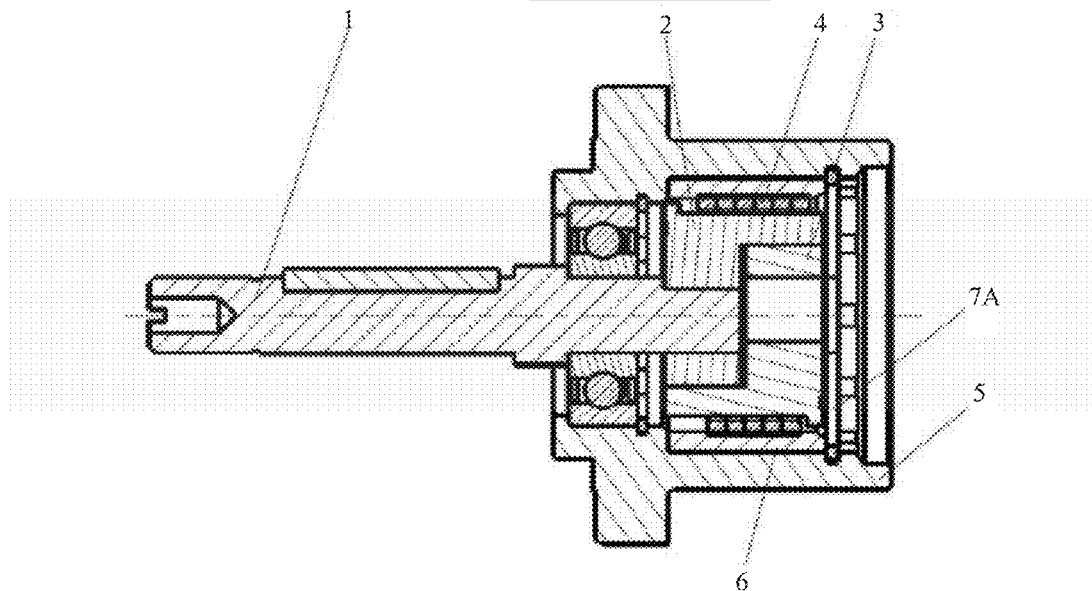
FIG. 1 shows a sectional drawing of a brake device according to the prior art.
Figure 2:
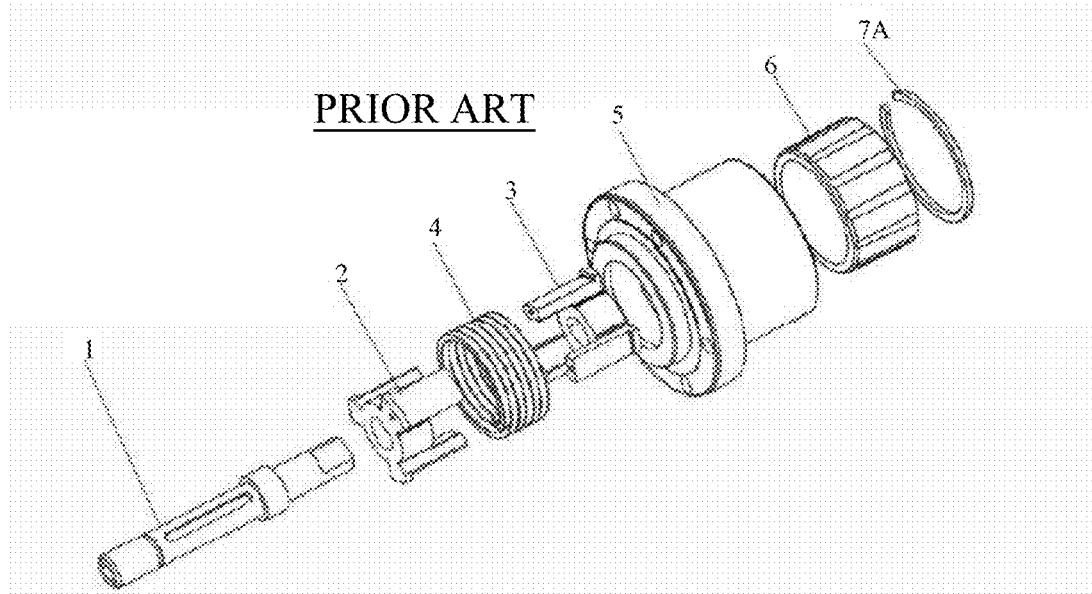
FIG. 2 shows a perspective exploded view of a brake device according to the prior art.

In order to understand the differences between the present invention and the prior art more clearly, first of all the prior art is explained concisely according to FIGS. 1 and 2.

A brake device for an actuator as shown in FIGS. 1 and 2 provides a gear shaft 1, two claws 2 and 3, a friction coil spring 4 surrounding the two claws, a brake housing 5, a brake torque bushing 6 and an elastic snap ring 7A, wherein in the sectional drawing of FIG. 1, the brake torque bushing 6 is held in a brake housing through-hole of the brake housing 5 by means of the elastic snap ring 7A, anti-rotation ribs are disposed on an outer surface of the brake torque bushing 6, for the purpose of preventing rotation thereof relative to the brake housing, the friction coil spring 4 is located between the brake torque bushing 6 and the claws, the gear shaft 1 and one claw 2 of the claws are connected and can rotate in synchrony, a screw shaft 14 of the actuator (see FIG. 6) and the other claw 3 are connected and can rotate in synchrony, rotation of the claw 2 can cause the diameter of the friction coil spring to decrease, and rotation of the claw 3 can cause the diameter of the friction coil spring to increase, characterized in that the friction coil spring 4 surrounding the two claws is received in the brake housing through-hole of the brake housing, and when rotation of the claw 3 causes the diameter of the friction coil spring to increase, the friction coil spring 4 and the brake torque bushing 6 come into direct contact and rub against each other, thereby generating a braking torque. The brake torque bushing 6 is made of a plastic material, the brake housing 5 is made of aluminum, the friction coil spring 4 is made of spring steel, and the coefficient of friction between the brake torque bushing 6 and the friction coil spring 4 is 0.04.

In order to simplify the structure of the brake device in the prior art and increase the braking torque, the present invention proposes a novel brake device.

Figure 3:
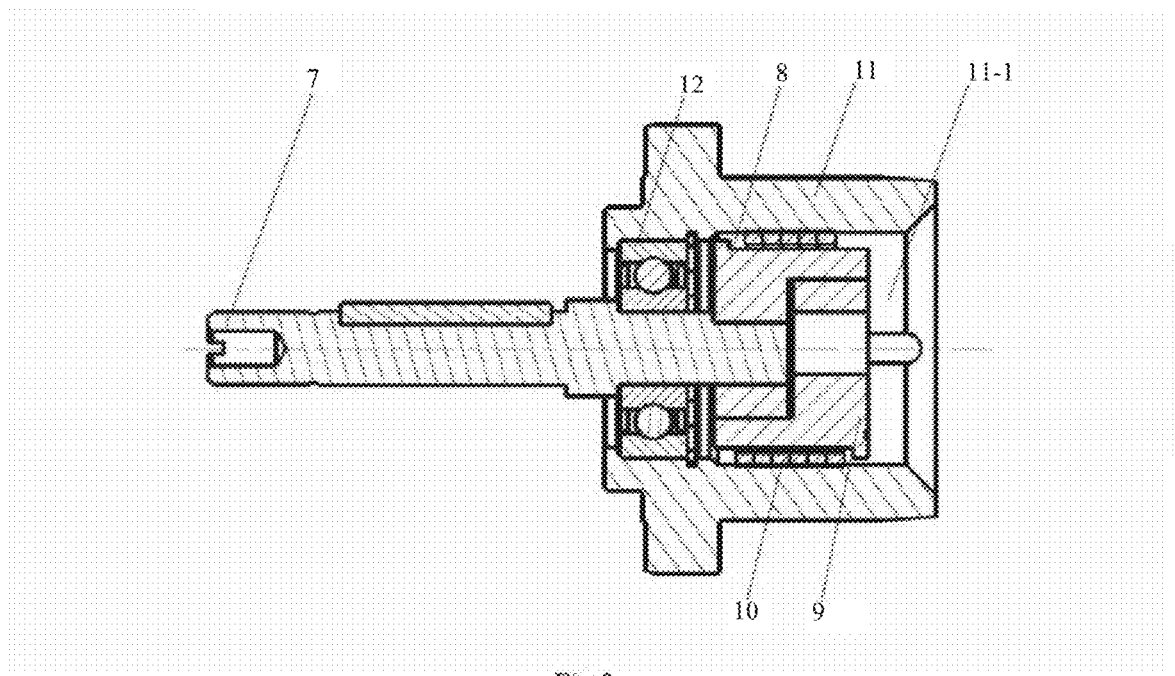
FIG. 3 shows a sectional drawing of a brake device according to the present invention.
Figure 4:
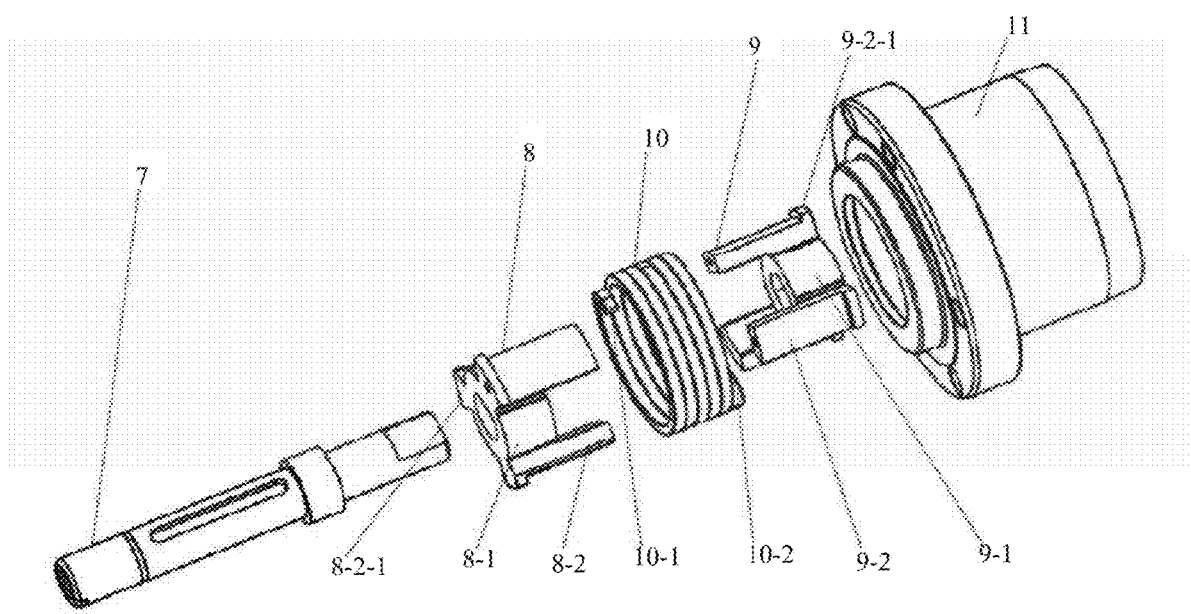
FIG. 4 shows a perspective exploded view of a brake device according to the present invention.

FIG. 3 shows a sectional drawing of a brake device according to the present invention; FIG. 4 shows a perspective exploded view of a brake device according to the present invention.

A brake device for a linear actuator according to an embodiment of the present invention provides a torque transmission mechanism for forward transfer of a driving torque; the torque transmission mechanism provides a driving torque input shaft 7 and a first coupled claw (first coupled part) 8 which is reliably connected to the driving torque input shaft 7 and capable of rotating in synchrony therewith, as well as a driving torque output shaft 14 (see FIG. 6) and a second coupled claw (second coupled part) 9 which is reliably connected to the driving torque output shaft and capable of rotating in synchrony therewith; the first coupled claw 8 and second coupled claw 9 match and are engaged with each other, and are used to transfer driving torque in a forward direction from the driving torque input shaft 7 to the driving torque output shaft; also included is a spring friction mechanism for blocking backward transfer of a load torque, the spring friction mechanism comprising a brake housing 11 and a friction coil spring 10 disposed elastically in a cylindrical inner hole 11-1 of the brake housing 11, the friction coil spring 10 being formed with end parts 10-1 and 10-2 at two axial ends thereof, for hooking onto the first coupled claw 8 and second coupled claw 9, and the first coupled claw 8 being arranged to hook onto the end parts 10-1 and 10-2 in a spiral direction of the friction coil spring 10 along a circumference; the second coupled claw 9 is arranged to hook onto the end parts 10-1 and 10-2 against the spiral direction of the friction coil spring 10 along a circumference; the friction coil spring 10 contacts an inner surface of the cylindrical inner hole 11-1 of the brake housing 11, with no additional friction component being disposed there between.

The meaning of the forward transfer is: as shown in FIG. 4, rotation of the driving torque input shaft 7 drives the first coupled claw 8 to rotate, so that the first coupled claw 8 hooks onto the end parts 10-1 and 10-2 in the spiral direction of the friction coil spring 10 along a circumference, causing the friction coil spring 10 to contract in the spiral direction thereof (become long and narrow, with a reduced radial diameter), thereby reducing friction between the friction coil spring 10 and the brake housing 11, and permitting transfer of driving torque from the first coupled claw 8 to the second coupled claw 9.

The meaning of the backward transfer is: as shown in FIG. 4, under the action of a load torque, rotation of the driving torque output shaft 14 (see FIG. 6) drives the second coupled claw 9 to rotate, so that the second coupled claw 9 hooks onto the end parts 10-1 and 10-2 against the spiral direction of the friction coil spring 10 along a circumference, causing the friction coil spring 10 to expand against the spiral direction thereof (become short and wide, with an increased radial diameter), thereby increasing friction between the friction coil spring 10 and the brake housing 11, and blocking backward transfer of the load torque from the second coupled claw 9 to the first coupled claw 8.

In order to increase braking torque, the brake housing 11 is arranged such that the coefficient of friction between the material of the inner surface thereof and the friction coil spring 10 is greater than the coefficient of friction between a steel coil spring 4 and a plastic torque bushing 6 in the prior art.

Thus, in the present disclosure, both the friction coil spring 10 and the brake housing 11 are made of a steel material, e.g. the brake housing 11 is made of #45 carbon steel material.

The coefficient of friction between the friction coil spring and the brake housing made of steel material is 0.09 to 0.19.

The friction coil spring 10 is cylindrical, and the two end parts 10-1 and 10-2 of the friction coil spring are bent inwards towards each other in a diametric direction.

The first claw 8 provides a first claw base 8-1 and three first claw branches 8-2 disposed at equal circumferential intervals along an external circumference of the first claw base 8-1; the second claw 9 provides a second claw base 9-1 and three second claw branches 9-2 disposed at equal circumferential intervals along an external circumference of the second claw base 9-1.

Figure 5A:
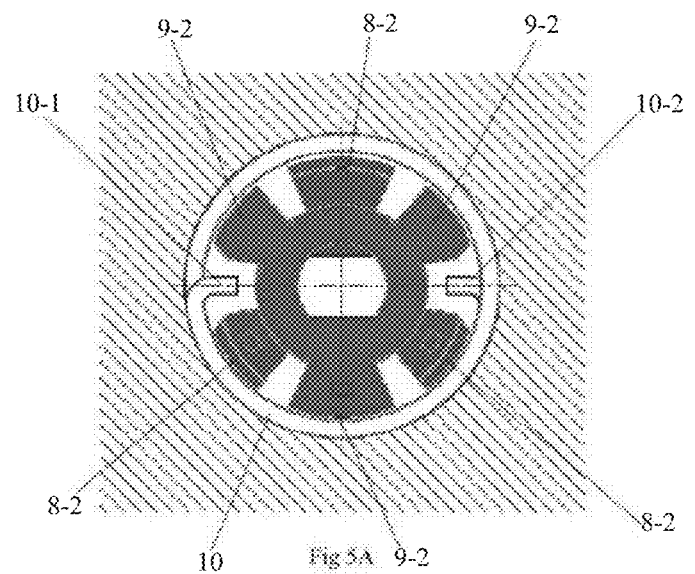
FIG. 5A shows an assembly drawing of the coupled claws and the friction coil spring according to the present invention.

As shown in FIG. 5A, when the first claw 8, the second claw 9 and the friction coil spring 10 are fitted together, the first claw branches 8-2 and the second claw branches 9-2 are arranged in an alternating manner.

Figure 5B:
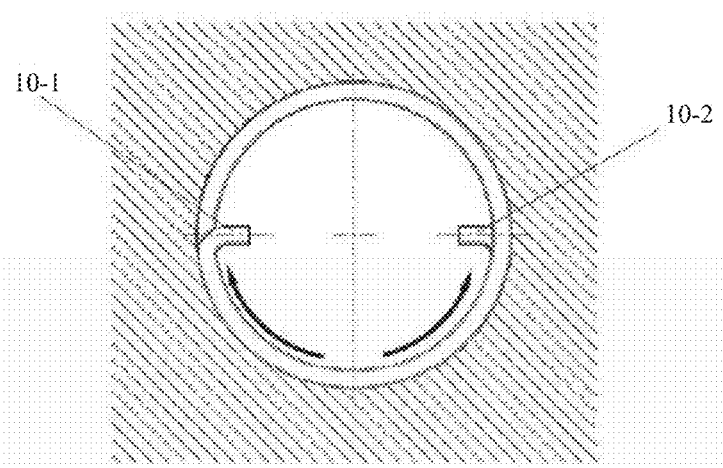
FIGS. 5B and 5C show schematic diagrams of states of operation of the friction coil spring according to the present invention in the directions of decreasing and increasing diameter thereof respectively.
Figure 5C:
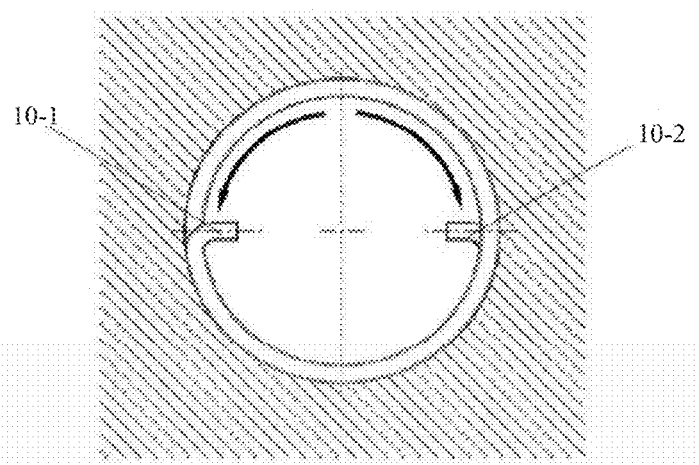

FIGS. 5B and 5C show schematic diagrams of states of operation of the friction coil spring according to the present invention in the directions of decreasing and increasing diameter thereof respectively, wherein two of the first claw branches 8-2 can contact the two end parts 10-1 and 10-2 of the friction coil spring 10 respectively, and can cause the diameter of the friction coil spring 10 to decrease when the first claw 8 rotates (along the clockwise or anticlockwise arrow in FIG. 5B), in which case the frictional force between the friction coil spring 10 and the inner circumferential surface of the cylindrical inner hole 11-1 decreases, thereby permitting free rotation of the spring 10; two of the second claw branches 9-2 can contact the two end parts 10-1 and 10-2 of the friction coil spring 10 respectively, and can cause the diameter of the friction coil spring 10 to increase when the second claw 9 rotates (along the clockwise or anticlockwise arrow in FIG. 5C), in which case the frictional force between the friction coil spring 10 and the inner circumferential surface of the cylindrical inner hole 11-1 increases sharply, thereby generating a braking torque.

As shown in FIG. 3, a supporting bearing 12 is disposed inside one end of the cylindrical inner hole 11-1 of the brake housing 11, for supporting the driving torque input shaft 7 by rolling.

As FIG. 4 shows, each of the first claw branches 8-2 and each of the second claw branches 9-2 is provided with a first claw branch holding shoulder 8-2-1 and a second claw branch holding shoulder 9-2-1 respectively, the friction coil spring 10 being limited between the first claw branch holding shoulder 8-2-1 and the second claw branch holding shoulder 9-2-1.

As FIG. 6 shows, another embodiment according to the present invention discloses a linear actuator, comprising a motor shaft 15, a first stage input gear 16, a first stage output gear 17, a second stage input gear 18, a second stage output gear 19, a clutch 20, an ending gear output shaft 13, a screw shaft 14 and a brake device as described above, wherein the second stage output gear 19 is connected by means of a shaft sleeve and a key to the ending gear output shaft 13 and rotates in synchrony therewith, the driving torque input shaft 7 of the brake device is the ending gear output shaft 13 for torque transfer in the linear actuator, or is connected synchronously with the ending gear output shaft 13; and the driving torque output shaft of the brake device is the screw shaft 14 in the linear actuator, or is connected synchronously with the screw shaft 14.

FIG. 6 also shows the brake device of the present invention including the friction coil spring 10; the brake device can transfer driving torque in a forward direction from the ending gear output shaft 13 to the screw shaft 14, and can be used to block backward transfer of a load torque, i.e. prevent a load torque from the screw shaft 14 from being transferred in a backward direction to the ending gear output shaft 13.

By comparing the structures in FIGS. 2 and 4, it can be seen that based on the structure of the present invention, the generation of braking torque is realized by direct contact friction between the friction coil spring 10 made of steel material and the brake housing 11 made of #45 carbon steel, and the coefficient of friction (0.09 to 0.19) there between in FIG. 4 is significantly larger than the coefficient of friction (0.04) between the friction coil spring 4 and the brake torque bushing 6 in FIG. 2. Experiments have demonstrated that the brake device according to the present invention can guarantee the braking torque needed in practice, and has no need for a brake torque bushing.

Based on the structure of the present invention described above, those skilled in the art have no need to design a steel friction spring and plastic brake torque bushing of larger diameter. The design of the present invention avoids the unfavorable situation of the brake device having an increased volume, and can also be implemented when the application space is cramped.

Based on the structure of the present invention described above, since the brake housing 11 itself provides a braking torque to the friction coil spring 10 directly, it is no longer necessary to dispose a brake torque bushing made of plastic in a brake housing made of aluminum, there is no need to use an elastic snap ring to hold the brake torque bushing in place, and there is likewise no need to dispose a mating structure corresponding to anti-rotation ribs of the brake torque bushing on an inner surface of the brake housing, therefore the assembly process and manufacturing process are simplified while the number of components is reduced.

It should be understood that any changes or improvements to the brake device which comply with the definitions in the attached claims shall be included in the scope of protection of the present invention.

The invention claimed is:

1. A brake device for a linear actuator, comprising:
   a torque transmission mechanism for forward transfer of a driving torque, the torque transmission mechanism providing:
   a driving torque input shaft and a first coupled claw connected to the driving torque input shaft and capable of rotating in synchrony therewith,
   a driving torque output shaft, and a second coupled claw connected to the driving torque output shaft and capable of rotating in synchrony therewith, the first coupled claw and second coupled claw matching and being engaged with each other, and being used to transfer driving torque in a forward direction from the driving torque input shaft to the driving torque output shaft,
   a spring friction mechanism for blocking backward transfer of a load torque, the spring friction mechanism providing:
   a brake housing being a single unitary component which contacts a bearing located therein and which contacts a friction coil spring, and
   the friction coil spring disposed elastically in a cylindrical inner hole of the brake housing, the friction coil spring being formed with end parts at two axial ends thereof, wherein the end parts are positioned diametrically opposite from each other, for hooking onto the first coupled claw and the second coupled claw, wherein the first coupled claw provides a first coupled claw base and three first coupled claw branches disposed at equal circumferential intervals along an external circumference of the first coupled claw base, and wherein the second coupled claw provides a second coupled claw base and three second coupled claw branches disposed at equal circumferential intervals along an external circumference of the second coupled claw base, wherein
   the first coupled claw is arranged to hook onto the end parts in a spiral direction of the friction coil spring along a circumference, wherein
   the second coupled claw is arranged to hook onto the end parts against the spiral direction of the friction coil spring along a circumference, and wherein
   the friction coil spring contacts an inner surface of the cylindrical inner hole of the brake housing, with no additional friction component being disposed there between such that the brake housing does not have a bushing located between the brake housing and the friction coil spring.

2. The brake device according to claim 1, wherein the brake housing is arranged such that the coefficient of friction between the material of the inner surface thereof and the friction coil spring is greater than the coefficient of friction between a plastic material and a steel material.

3. The brake device according to claim 2, wherein the friction coil spring and the brake housing are both made of a steel material.

4. The brake device according to claim 3, wherein the brake housing is made of #45 carbon steel material.

5. The brake device according to claim 1, wherein the friction coil spring is cylindrical, and the two end parts of the friction coil spring are bent inwards towards each other in a diametric direction.

6. The brake device according to claim 5, wherein when the first coupled claw, the second coupled claw and the friction coil spring are fitted together, the first coupled claw branches and the second coupled claw branches are arranged in an alternating manner; two of the first coupled claw branches contact the two end parts of the friction coil spring respectively; and two of the second coupled claw branches can contact the two end parts of the friction coil spring respectively.

7. The brake device according to claim 1, wherein a supporting bearing is disposed inside one end of the cylindrical inner hole of the brake housing, for supporting the driving torque input shaft.

8. The brake device according to claim 5, wherein each of the first coupled claw branches and each of the second coupled claw branches is provided with a first coupled claw branch holding shoulder and a second coupled claw branch holding shoulder respectively, the friction coil spring being limited between the first coupled claw branch holding shoulder and the second coupled claw branch holding shoulder.

9. A linear actuator comprising:
a brake device having a torque transmission mechanism for forward transfer of a driving torque, the torque transmission mechanism providing:
a driving torque input shaft and a first coupled claw connected to the driving torque input shaft and capable of rotating in synchrony therewith,
a driving torque output shaft, and a second coupled claw connected to the driving torque output shaft and capable of rotating in synchrony therewith, wherein the first coupled claw provides a first coupled claw base and three first coupled claw branches disposed at equal circumferential intervals along an external circumference of the first coupled claw base, and wherein the second coupled claw provides a second coupled claw base and three second coupled claw branches disposed at equal circumferential intervals along an external circumference of the second coupled claw base, the first coupled claw and second coupled claw matching and being engaged with each other, and being used to transfer driving torque in a forward direction from the driving torque input shaft to the driving torque output shaft,
a spring friction mechanism for blocking backward transfer of a load torque, the spring friction mechanism providing:
a brake housing being a single unitary component which contacts a bearing located therein and which contacts a friction coil spring, and
the friction coil spring disposed elastically in a cylindrical inner hole of the brake housing, the friction coil spring being formed with end parts at two axial ends thereof, wherein the end parts are positioned diametrically opposite from each other, for hooking onto the first coupled claw and the second coupled claw, wherein the first coupled claw is arranged to hook onto the end parts in a spiral direction of the friction coil spring along a circumference, wherein
the second coupled claw is arranged to hook onto the end parts against the spiral direction of the friction coil spring along a circumference, wherein
the friction coil spring contacts an inner surface of the cylindrical inner hole of the brake housing, with no additional friction component being disposed there between, such that the brake housing does not have a bushing located between the brake housing and the friction coil spring, and wherein
the driving torque input shaft is an ending gear output shaft for torque transfer in the linear actuator, or is connected synchronously with the ending gear output shaft; and the driving torque output shaft is a screw shaft in the linear actuator, or is connected synchronously with the screw shaft.

\* \* \* \* \*